United States Patent

Jordan et al.

Patent Number: 5,519,639
Date of Patent: May 21, 1996

[54] LEVEL INDICATION SYSTEM

[75] Inventors: Chris A. Jordan, Reynoldsburg; Rajat L. Patel, Lancaster, both of Ohio; Stephen L. Eschbach, Lynchburg, Va.

[73] Assignee: The Babcock & Wilcox Company, New Orleans, La.

[21] Appl. No.: 207,492

[22] Filed: Mar. 4, 1994

[51] Int. Cl.⁶ .................................. G01F 23/00
[52] U.S. Cl. .............. 364/509; 73/290 R; 364/562; 340/612
[58] Field of Search .............. 73/290 R; 340/612, 340/620; 364/482, 509, 562

[56] References Cited

U.S. PATENT DOCUMENTS

| | | | |
|---|---|---|---|
| 2,911,828 | 11/1959 | Keating et al. | 73/290 R |
| 3,113,456 | 12/1963 | Smith, Jr. et al. | 73/290 R |
| 3,326,043 | 6/1967 | Roeske et al. | 73/290 R |
| 3,389,250 | 6/1968 | Clemens | 73/290 R X |
| 3,424,002 | 1/1969 | Johnson | 73/290 R |
| 3,443,438 | 5/1969 | Martin et al. | 340/620 X |
| 3,474,337 | 10/1969 | Petrick | 73/290 R X |
| 3,695,107 | 10/1972 | Hertz et al. | 73/290 R |
| 3,955,358 | 5/1976 | Martz et al. | 60/39.18 B |
| 3,965,675 | 6/1976 | Martz et al. | 60/39.18 B |
| 3,974,644 | 8/1976 | Martz et al. | 60/39.18 B |
| 4,028,884 | 3/1977 | Martz et al. | 60/39.18 B |
| 4,031,404 | 4/1977 | Martz et al. | 290/40 R |
| 4,639,718 | 8/1987 | Gasper | 340/603 |
| 5,279,158 | 1/1994 | Teigen et al. | 73/302 |

OTHER PUBLICATIONS

Merli Sales Brochure (no date).
Instruction Manual for the Diamond Merli Control Unit Jan. 1991 and Jun. 1992.
Instruction Manual for the Merli Pressure Vessel Apr. 1991.

*Primary Examiner*—Edward R. Cosimano
*Attorney, Agent, or Firm*—Daniel S. Kalka; Robert J. Edwards

[57] ABSTRACT

A system for monitoring the water level of a pressure drum having a pressure column comprises a plurality of electrodes communicating with the column for contacting water and steam within the column. Each electrode has its own location and produces a first output which corresponds to the presence of water or a second output which corresponds to the presence of steam. A discriminator is operatively connected to the electrodes; and the discriminator has an analog-to-digital converter for receiving the output of each electrode and converting the output to a digital signal which represents the water conductivity for each electrode. A central processor is operatively connected to the discriminator for powering the discriminator as well as for receiving the digital signals in order to determine a slope degradation between the conductivity and the location of each electrode in the column. The central processor also determines an inflection point between the water and the steam in the column. An LED display is used to indicate which of the electrodes are located in water and which of the electrodes are located in steam.

5 Claims, 4 Drawing Sheets

LEVEL INDICATION SYSTEM

FIELD AND BACKGROUND OF THE INVENTION

The present invention relates, in general, to boiler drums and, in particular, to a new and useful system for monitoring the water level of a drum at a pressure column.

Presently, water level indication devices are utilized at a pressure column of a pressure drum of a boiler in order to indicate the presence of water and steam. One device which has been utilized is a multiple electrode remote level indicator (MERLI). MERLI is used as a trademark for a drum gauge sold by the Diamond Power Specialty Company of Lancaster, Ohio.

Existing devices such as the MERLI Drum Gauge have proved to be unreliable during cyclic type conditions. Cyclic boiler operation, often experienced at power plants used for peak power consumption only, results in dynamic water conductivity levels, resulting from a combination in drum pressure and water chemistry. This results from a change in drum pressure. Thus, the higher the normal operation pressure, the more dramatic the conductivity changes.

The MERLI device determines water level of the drum by measuring the difference in conductivity of water versus steam through a set of electrodes which penetrate the side of the MERLI Water Column. Thus, alteration in water conductivity may bias the results. The existing circuitry of the MERLI contains a sensitivity adjustment so that the boiler operator can adjust the unit to the current boiler conditions, i.e. water conductivity. This requires that the MERLI sensitivity be constantly readjusted during start-up and shut-down.

Water and steam from the drum is present within the column and the steam condenses on the internal surface of the column causing a sweating effect. This effect, prevalent in high pressure units, will actually alter conductivity measurements by not allowing the electrodes to adequately dry. As shown in FIG. 1, if this occurs, and the sensitivity between water and steam is relatively close, an electrode located in the presence of steam may appear to be conducting. This is known as water-over-steam fault which is indicated at 10.

Presently, there is no known device operating from a conductivity/resistivity measurement which avoids this problem.

SUMMARY OF THE INVENTION

The present invention pertains to the monitoring of water levels of a boiler drum through the use of electrodes placed at the pressure column of the boiler drum. The present invention is a system for monitoring the water level of a drum at a pressure column and comprises a plurality of electrodes which communicate with the column for contacting water and steam within the column. Each electrode has a location within the column and emits a first output corresponding to the presence of water or a second output which corresponds to the presence of steam.

A discriminator circuit is operatively connected to the electrodes; and the discriminator includes an analog-to-digital converter which receives the output of each electrode and converts the output to a digital signal which represents the water conductivity for each electrode.

A central processing unit such as a micro-processor is operatively connected to the discriminator for powering the discriminator and for receiving the digital signals produced by the converter in order to determine a slope degradation between the conductivity of each electrode and the location of each electrode within the column. The central processor also determines an inflection point between the water and steam within the column. The results of an absolute and from the relative comparisons are combined to determine the transition point. An LED display is operatively connected to the central processor for indicating which of the electrodes are located within the presence of water and which of the electrodes are located within the presence of steam.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 3:
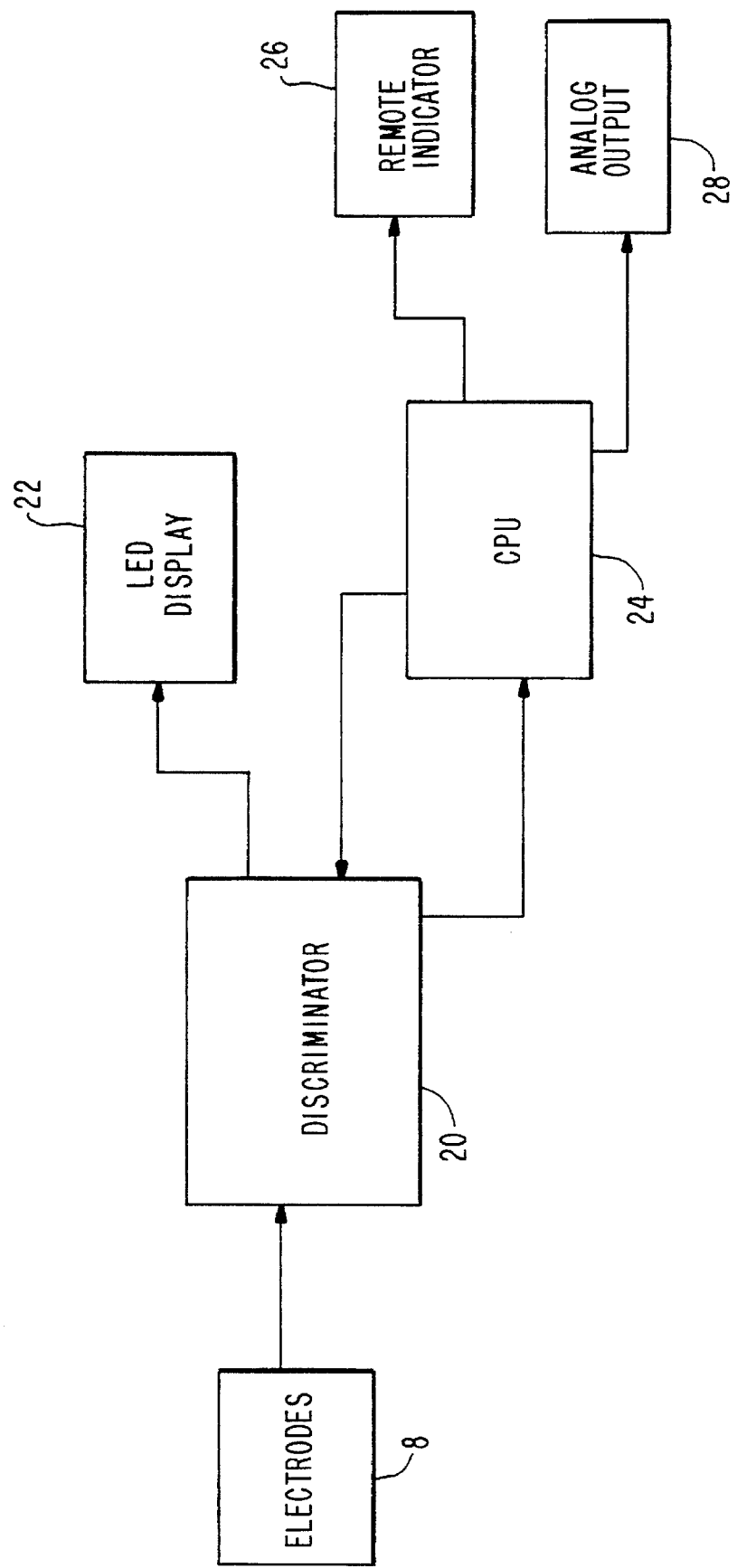
FIG. 3 is a schematic diagram of a known drum gauge.

FIG. 3 illustrates a known drum pressure gauge, such as a MERLI device, which has electrodes 8 that are located within a pressure column. A discriminator 20 is operatively connected to the electrodes wherein an LED display 22 is operatively connected to the discriminator for displaying which electrodes are located in the presence of water and which electrodes are located in the presence of steam. A central processing unit (CPU) 24 operates discriminator 20 and receives water conductivity signals according to each electrode from discriminator 20, and in turn, provides signals to remote indicator 26 and analog output 28.

Figure 4:
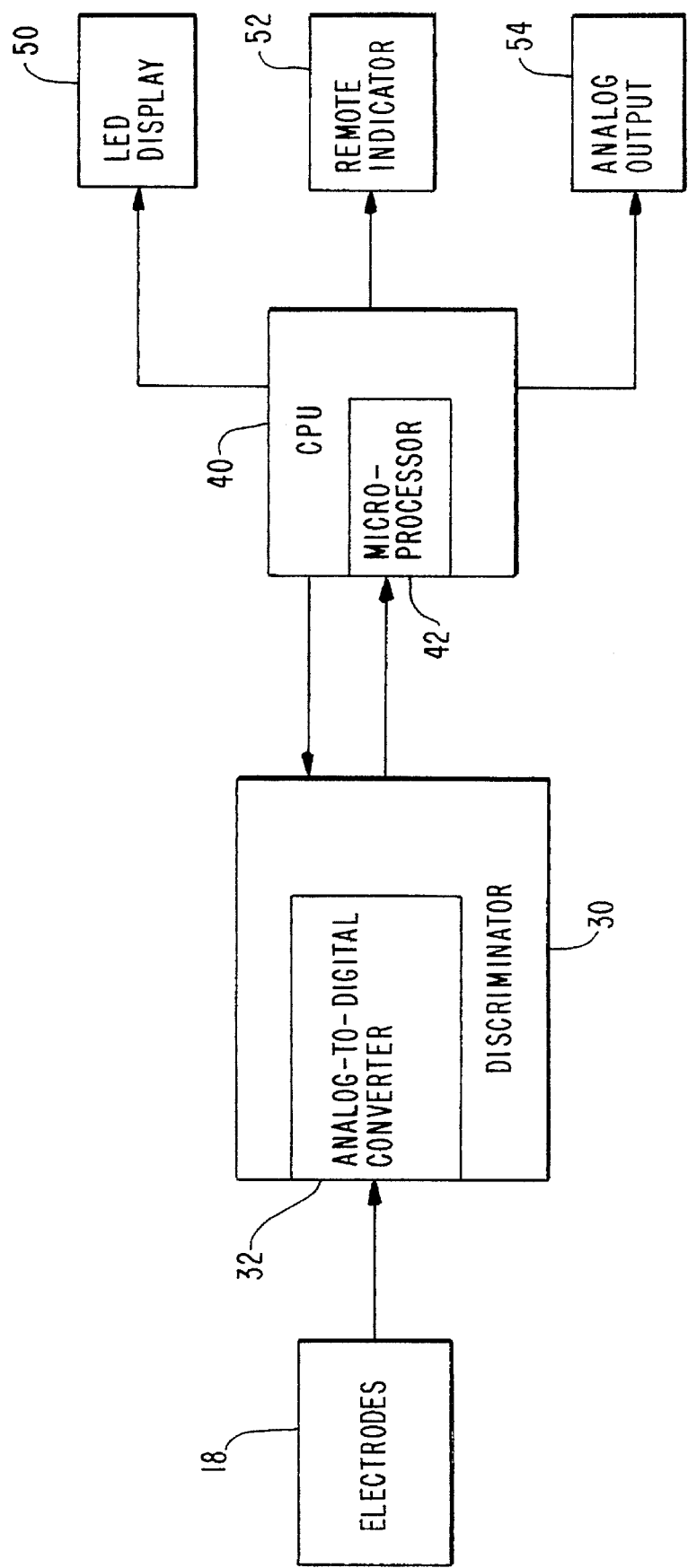
FIG. 4 is a schematic diagram of a system according to the present invention.

According to the present invention, as shown in FIG. 4, electrodes 18, which are located at pressure column 12 of a drum 1 (FIG. 2), are operatively connected to a discriminator 30 having an analog-to-digital converter 32 for performing a logic operation, i.e. determining the water conductivity at each electrode 18. CPU 40 has a microprocessor 42 which operates discriminator 30 and sends processed logic signals to an LED display 50, remote indicator 52 and analog output 54.

Discriminator 30 is a universal digital discriminator circuit which comprises input impedance bridges, sample-and-hold circuitry, analog-to-digital converters, I/O ports, transparent latches, address decoding circuitry and output interface circuits. Microprocessor 42 and associated program memory are located on separate CPU board 40.

Each discriminator board contains components sufficient to process eight inputs. Multiple discriminator boards may be used. Their operation and interaction is controlled by the program in the CPU board.

Depending on the types of sensors used, the impedance bridges on the discriminator boards are excited by either a DC voltage or a bipolar rectangular wave. Data collection consists of capturing the bridge inputs of all the discriminator boards at the same time (within a few microseconds) and storing the data in memory. Each bridge on each discriminator board is read three times and the data from each reading is stored in memory so data validation can be performed.

The median data value for each bridge is selected and stored. The selected data are compared to predetermined values, stored in software, that represent the limits of known conditions. For example, in using conductivity bridges to discriminate between steam 4 and water 2 in vessel 1 the limits of known conditions would be that conductivity greater than which the fluid is assumed to be water 2, and that conductivity less than which the fluid is assumed to be steam 4. There is generally a region between these values in which the fluid could be either water 2 or steam 4.

The discriminator 30 compares the inputs of adjacent bridges and determines their ratio. If the ratio exceeds a certain predetermined value stored in memory, the transition from one state to another is assumed to occur between the sensors of those adjacent bridges. The discrimination by ratio is independent of absolute input values and can function over an input range of several orders of magnitude. The absolute method of discrimination works only at one specific point over the range of possible inputs.

Figure 1:
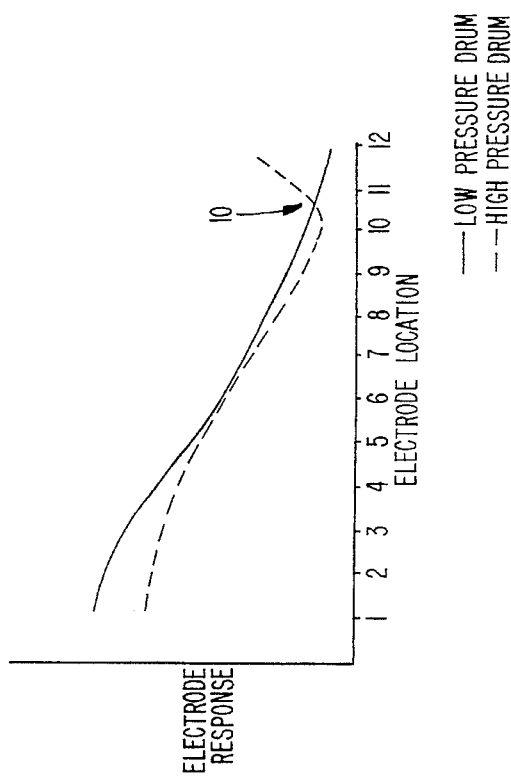
FIG. 1 is a graph plotting electrode response versus electrode location for drum gauge devices.
Figure 2:
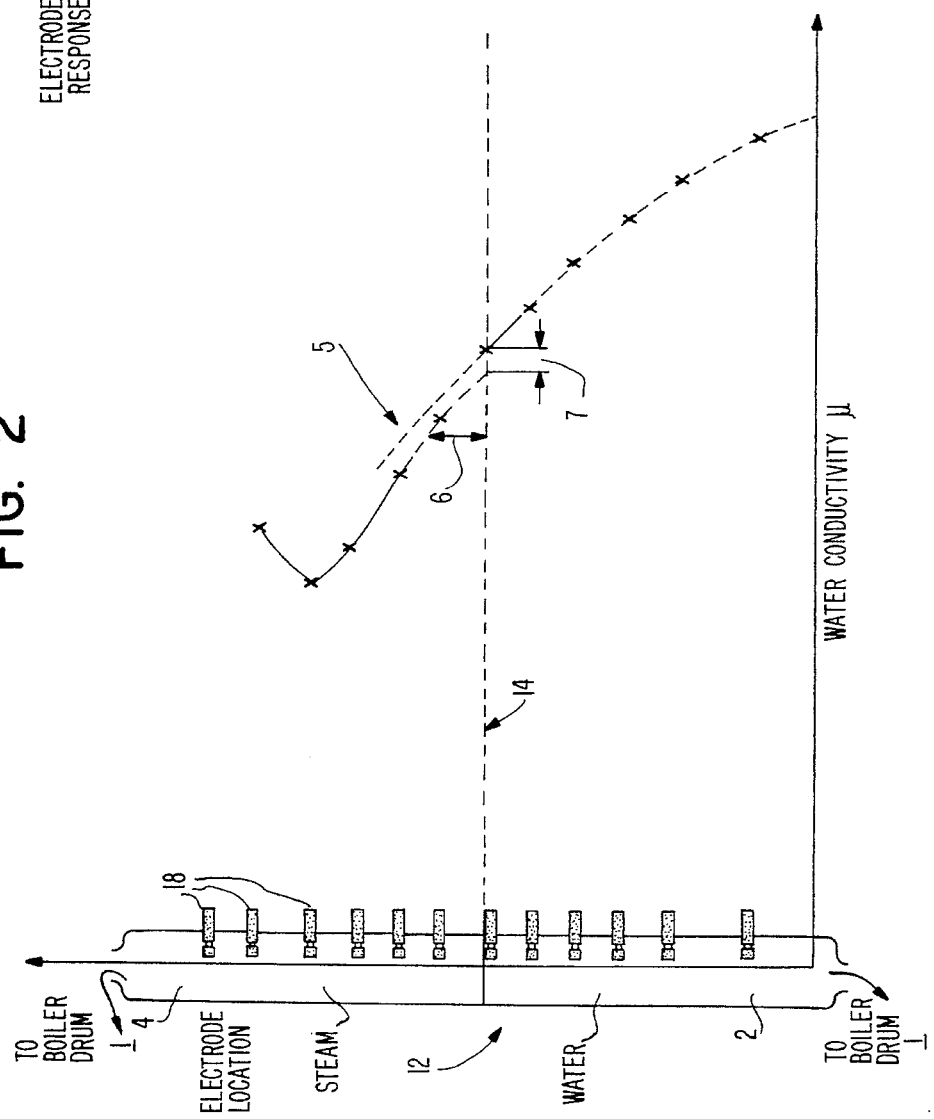
FIG. 2 is a graph plotting electrode location versus water conductivity for a pressure column having electrodes which is schematically superimposed.

The logic operation is accomplished at the analog-to-digital converter 32 which receives an electrode signal from electrodes 18 communicating with the interior of a pressure column 12 of a boiler drum 1 as shown in FIG. 2. Electrodes 18 detect the presence of steam 4 or water 2 within column 12.

Water level 14 is determined through the water conductivity of each electrode 18. This logic operation is accomplished by having the analog-to-digital converter 32 receive electrode signals from electrodes 18 which correspond to steam 4 or water 2 and convert any signals to an eight-digit word representing the water conductivity at each electrode. As shown in FIG. 2, once all of the electrode signals are converted according to this format by converter 32 (FIG. 4), microprocessor 42 determines a slope degradation 5 between the conductivity and location of electrodes 18. At the transition level between the water 2 and steam 4, the slope, although not changing in degradation, exhibits a step function decrease indicated at 7. The micro-processor 42 (FIG. 4) outputs the water-steam levels by finding an inflection point 6 between the water 2 and the steam 4.

Water over steam conditions are minimized by using the combination of a ratio comparison and absolute measurement of the liquid level.

Figure 5:
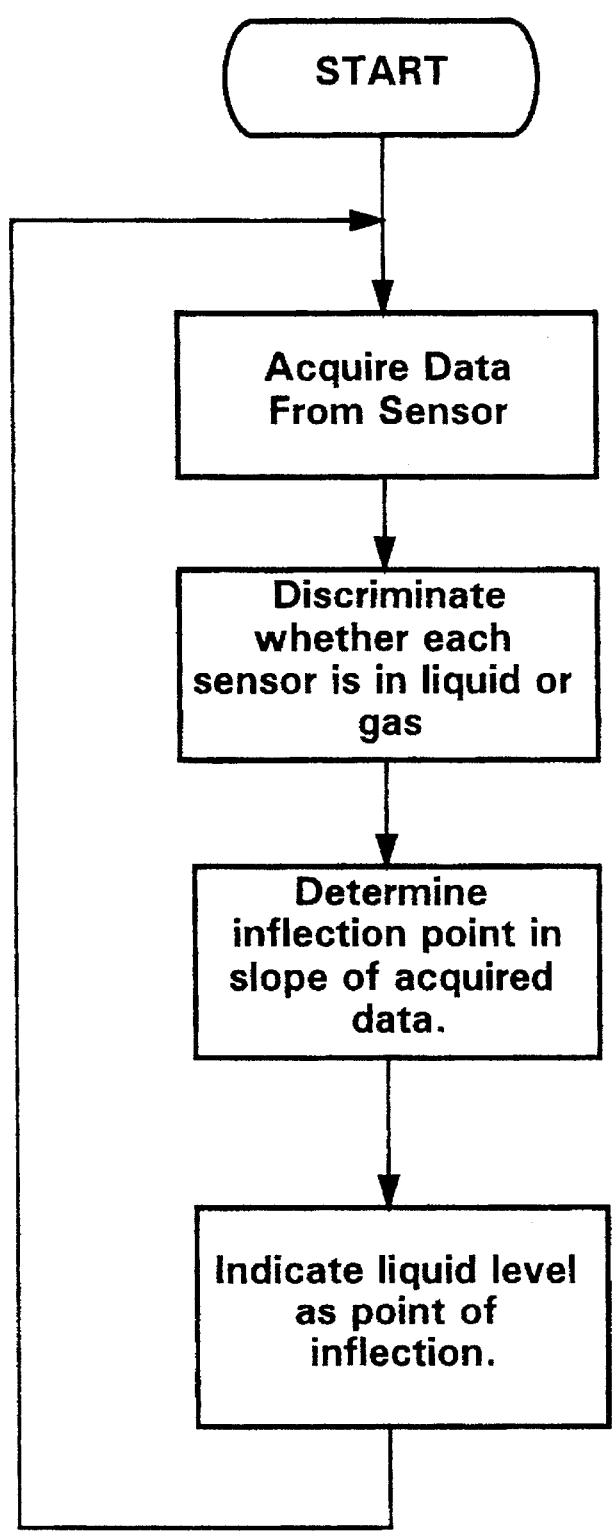
FIG. 5 is a flow chart indicating the steps of the present invention.

FIG. 5 is a simple flow chart which describes the functioning of the current invention. The flow chart is written in a flow chart convention which is known by those skilled in the art and describes the steps of the present invention.

While specific embodiments of the invention have been shown and described in detail to illustrate the application of the principles of the invention, it will be understood that the invention may be embodied otherwise without departing from such principles.

What is claimed:

1. A system for monitoring a liquid level of a drum having a column which receives liquid and gas from the drum, the system comprising:

a plurality of electrodes communicating with the column for contacting the liquid and the gas, each electrode having a location in the column and each electrode emitting a first output corresponding to the presence of liquid or a second output corresponding to the presence of gas;

discriminator means operatively connected to the electrodes, the discriminator means having analog-to-digital converter means for receiving the output of each electrode and converting the output to a digital signal representing a liquid conductivity for each electrode;

central processor means operatively connected to the discriminator means for operating the discriminator means and for receiving the digital signals for performing a logic operation thereon in determining a slope degradation between the conductivity and the location of each electrode in the column, the central processor means determining an inflection point between the liquid and the gas in the column based on a step function decrease in the slope, the central processor means determining and outputting liquid-gas levels therefrom; and display means operatively connected with the central processor means for indicating which of the electrodes are located in the presence of liquid and which of the electrodes are located in the presence of gas from the output of liquid-gas levels.

2. The system according to claim 1, wherein the display means comprises a light emitting diode, LED.

3. The system according to claim 1, wherein the logic operation is based upon an averaged ratio of adjacent inputs to the discriminator means compared with a predetermined value.

4. The system according to claim 1, including remote indication means operatively connected to the central processing means for displaying a water level in the column based on the digital signals received by the central processing means.

5. The system according to claim 2, including analog output means operatively connected to the central processing means.

* * * * *